United States Patent [19]

Morrill

[11] Patent Number: 4,939,397
[45] Date of Patent: Jul. 3, 1990

[54] SPRAY-RESISTANT ELECTRIC MOTOR

[76] Inventor: Giles W. Morrill, 3 Matson Ct., Johnson City, Tenn. 37604

[21] Appl. No.: 417,499

[22] Filed: Oct. 5, 1989

[51] Int. Cl.[5] ............................................. H02K 5/10
[52] U.S. Cl. ...................................... 310/88; 248/901; 310/77
[58] Field of Search ................ 248/901; 292/144, 201; 310/77, 88, 89, 62

[56] References Cited

U.S. PATENT DOCUMENTS

| | | |
|---|---|---|
| 1,501,497 | 3/1921 | Schwarz . |
| 1,771,281 | 7/1927 | Wilsing . |
| 2,172,440 | 11/1936 | Edmondson . |
| 2,488,122 | 2/1943 | Griffith . |
| 2,694,781 | 11/1954 | Hinz ........................................ 310/77 |
| 4,059,339 | 11/1977 | Brown ..................................... 310/77 |
| 4,287,662 | 9/1981 | Otto ........................................ 310/88 |
| 4,535,262 | 8/1985 | Newberg ................................ 310/88 |
| 4,689,511 | 8/1987 | Baker et al. ........................... 310/88 |
| 4,827,166 | 5/1989 | Morrill ................................... 310/89 |

Primary Examiner—Peter S. Wong
Assistant Examiner—D. L. Rebsch
Attorney, Agent, or Firm—Pearne, Gordon, McCoy & Granger

[57] ABSTRACT

A spray-resistant water shield is formed for an electric motor by a water shield of a plastics or elastomeric material. This water shield has a conical edge with a periphery which seals against the exterior surface of an end shield, as part of the frame of the motor. A spring in the motor urges the rotor to a position of displacement relative to the stator during de-energization of the motor so that the water spray seal is effected. When the motor is energized, the rotor tends to align with the stator and the water shield moves away from its sealed condition with the motor frame to establish normal running conditions of the motor.

9 Claims, 2 Drawing Sheets

SPRAY-RESISTANT ELECTRIC MOTOR

BACKGROUND OF THE INVENTION

A number of industries require periodic thorough cleaning of the equipment, which may include electric motors, in order to maintain health standards. For example, in the dairy industry, in a milking parlor, the automatic milking machines and associated pumping and refrigeration equipment must be thoroughly cleaned at least once a day, and usually after each milking shift. In the freezer cases, steam cleaning is required with high-pressure water streams to clean the equipment including motors and refrigeration equipment.

In Morrill U.S. Pat. No. 4,827,166, it was suggested that a spinner cone be utilized to throw off water spray. However, this meant that the motor had to be energized and running during the cleaning process, and normally everything in the food processing environment is not energized nor running during the cleaning process, so this is an anomaly.

Other patents have suggested some form of a spring to move a rotor axially and thus engage a friction brake, which friction brake is released by the electromagnetic pull between rotor and stator attempting to realign these two components. This axially acting spring and brake are suggested in U.S. Pat. Nos. 1,501,497; 1,771,281; 2,172,440; 2,488,122; 2,694,781; and 4,059,339.

SUMMARY OF THE INVENTION

The problem to be solved, therefore, is how to construct an electric motor which will be spray-resistant while de-energized, yet will be operable normally when energized.

This problem is solved by a spray-resistant electric motor comprising, in combination, a frame, a stator having a magnetic portion and mounted in said frame, a shaft journaled in said frame, a rotor mounted on said shaft and having a magnetic portion disposed for cooperation with said stator magnetic portion through an air gap, said frame enclosing said electric motor except for an aperture through which a distal end of the shaft extends, means for driving a load from the distal end of said shaft, a coaxial water shield mounted for rotation with said shaft and having a periphery means establishing an urging of said rotor to a position of axial displacement of said rotor magnetic portion relative to said stator magnetic portion to establish a moisture-proof seal between the periphery of said water shield and said frame to inhibit entering of water inside said electric motor, and whereby upon energization of said electric motor said rotor magnetic portion moves axially toward a smaller air gap with said stator magnetic portion against the urging of said urging means to relieve said moisture-proof seal during running of the motor.

Accordingly, an object of the invention is to provide a spray-resistant motor with a water shield which is in place when the motor is not running.

Other objects and a fuller understanding of the invention may be had by referring to the following description and claims, taken in conjunction with the accompanying drawing.

DESCRIPTION OF THE PREFERRED EMBODIMENTS

Figure 1:
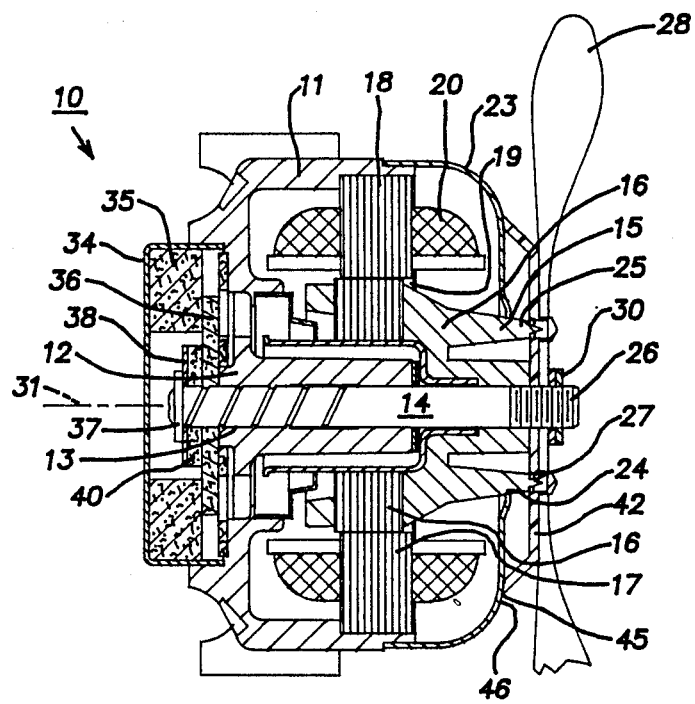
FIG. 1 is a longitudinal, sectional view of a motor incorporating the invention.
Figure 2:
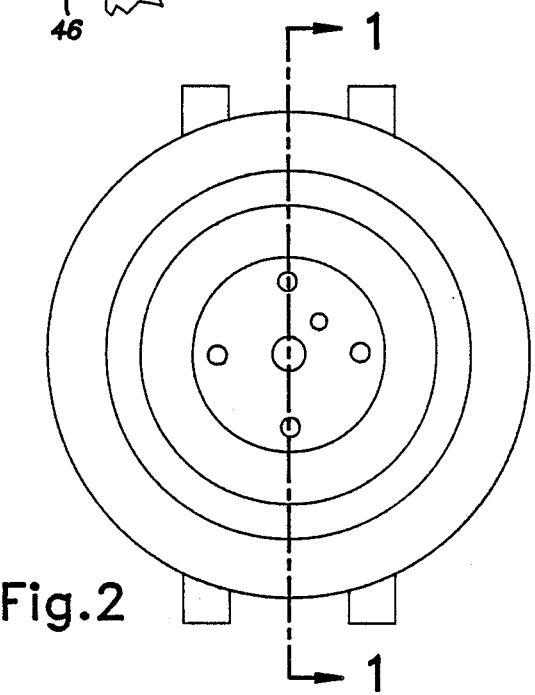
FIG. 2 is a front elevational view of the motor without the fan of FIG. 1.
Figure 3:
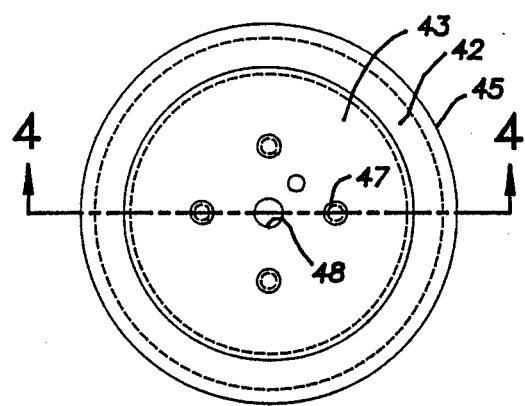
FIG. 3 is a front elevational view of a water shield used with the motor.
Figure 4:
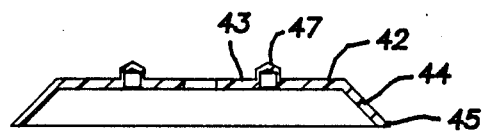
FIG. 4 is a cross-sectional view on line 4—4 of FIG. 3.

FIGS. 1 to 4 illustrate a spray-resistant electric motor 10 which has a frame 11. This frame may be of magnetic or non-magnetic material, such as aluminum, cast iron, or a composite material. The frame has a post 12 with a bearing aperture 13 journaling a shaft 14. Secured on the shaft is a rotor 15 which has a magnetic portion 16 to cooperate with a magnetic portion 17 of a stator 18 through a radial air gap 19. The stator 18 is fixedly mounted in the frame 11 and has stator windings 20. The motor 10 may be one with two bearings, one at each end of the shaft, but is shown as a unit bearing motor. The rotor 15 of this embodiment has a squirrel cage winding 16 which is of conductive material such as aluminum, and which is cast in a shape to engage the shaft 14 so that the shaft 14 turns with the rotor 15.

The frame 11 includes an end shield 23 which may be made of stamped sheet metal, for example, and which physically encloses and protects the stator and rotor. This end shield is generally cup-shaped and is forced onto a portion of the frame 11 with a tight fit which is water spray-resistant. The end shield 23 has a coaxial aperture 24 through which a distal end 25 of the rotor 15 extends and also through which a distal end 26 of the shaft 14 extends. The distal end 25 of the rotor is circular, and has a plurality of drive tips 27 shown as four in number which extend forwardly in an axial direction. These are for providing torque drive of a load, which in this case is shown as a fan blade 28. The drive tips extend through apertures 29 in the fan blade 28, and the fan blade is held on by a mounting means such as a nut 30. Due to these drive tips, the torque from the rotor need not pass merely through the shaft and nut 30 but, instead, passes through the drive tips, which are spaced a considerable distance from the axis 31 of the shaft.

A lubrication system 35 is provided for the motor 10, including an oil reservoir 34 with a wick 36 to feed oil from the oil reservoir to the shaft 14. A rotor restraint washer 37 is secured on the oil reservoir end of the shaft 14 and captures a thrust bearing 38. Urging means 40, in the form of a spring, is positioned between the thrust bearing 38 and the post 12 of the frame 11. This spring 40 may be foam or felt, or a wavy washer or other form of spring means to urge the shaft 14 and rotor 15 axially to the left, as shown in FIG. 1. This causes the rotor magnetic portion 16 to be axially displaced relative to the stator magnetic portion 17, as shown in FIG. 1.

Figure 5:
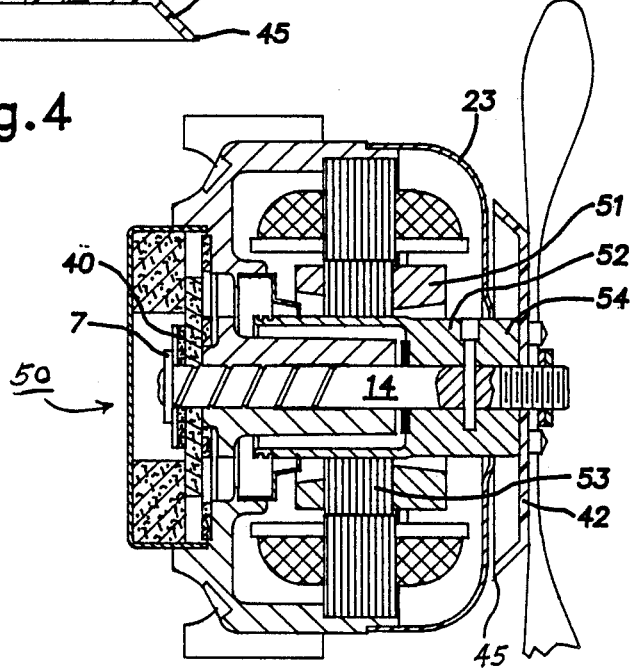
FIG. 5 is a longitudinal, sectional view of a modified motor.

A water shield 42 is provided on the distal end 26 of the shaft 14 and, as shown, is disposed between the fan blade 28 and the distal end of the rotor 25. This water shield is better shown in FIGS. 3 and 4, and includes a planar portion 43 and a conical portion 44 having a periphery 45. This periphery is in a plane normal to the shaft axis 31, and is urged by the urging means 40 into engagement with an exterior surface 46 on the end shield 23. This exterior surface is also in a plane perpendicular to the shaft axis so that the urging means can urge the periphery 45 into a tight spray-resistant condition with the electric motor. The water shield 42 may be made from a plastic or elastomer material so that the elasticity thereof helps to promote the spray-resistant water seal. The water shield also has unitary cups 47 which cover the drive tips 27 to prohibit water entrance at this point. The water shield 42 also has a coaxial aperture 48 for the shaft 14; however, this is a close fit with the shaft 14, and it is covered by the fan blade 28 plus the nut 30 to be water spray-resistant. The motor 10, when the stator windings 20 are energized, produces torque to turn the rotor 15. Also, there is a solenoid effect attempting to minimize the air gap 19, and it does this by axially displacing the rotor 15 to the right, as shown in FIG. 1, into the position shown in FIG. 5 whereat the rotor and stator magnetic portions 16 and 17 are essentially aligned. When this occurs, there will be a small gap, as shown in FIG. 5, between the water shield periphery 45 and the end shield 23. This permits the motor to run in its normal condition, without any frictional drag. The end shield, being made from a plastics or elastomeric material, however, does have minimal frictional drag on the end shield 23 so as not to inhibit any starting torque.

FIG. 5 illustrates a slightly different motor 50. This motor has a rotor 51 with a hub 52 pinned to the shaft 14 and on which are pressed the rotor laminations 53. The hub 52 has a distal end 54 with drive tips (not shown) spaced on the same bolt circle as the drive tips in the electric motor of FIG. 1. The construction is otherwise the same and, in this case, the water shield 30 periphery is shown spaced from the end shield 23 to show the conditions during running of the motor. During the time when the motor is de-energized, the urging means 40 will pull the rotor axially to be misaligned from the stator magnetic portion, and thus the water seal, as shown in FIG. 1, will be effected.

The water shield 42 may be internal of the end shield and move axially in the opposite direction to perform the water seal; however, it is shown external to the end shield and moves axially to the left to form the water seal.

The urging means may be the vertical disposition of the shaft axis 31 without an actual spring, merely using the weight of the rotor, shaft and fan blade to perform the water spray-resistant seal. The water spray-resistant seal prevents any forced moisture into the small clearance between rotating and stationary parts of the motor. This means that the motor may be de-energized during spray cleaning of the motor and its environment, such as in a food processing environment. It is able to withstand steam cleaning and high-pressure water streams which may be used in such food processing environment during periodic cleaning.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A spray-resistant electric motor comprising, in combination:
   a frame;
   a stator having a magnetic portion and mounted in said frame;
   a shaft journaled in said frame;
   a rotor mounted on said shaft and having a magnetic portion disposed for cooperation with said stator magnetic portion through an air gap;
   said frame enclosing said electric motor except for an aperture through which a distal end of the shaft extends;
   means for driving a load from the distal end of said shaft;
   a coaxial water shield mounted for rotation with said shaft and having a periphery;
   means establishing an urging of said rotor to a position of axial displacement of said rotor magnetic portion relative to said stator magnetic portion to establish a moisture-proof seal between the periphery of said water shield and said frame to inhibit entering of water inside said electric motor; and
   whereby upon energization of said electric motor said rotor magnetic portion moves axially toward a smaller air gap with said stator magnetic portion against the urging of said urging means to relieve said moisture-proof seal during running of the motor.

2. A spray-resistant electric motor as set forth in claim 1, wherein said air gap is a radial air gap.

3. A spray-resistant electric motor as set forth in claim 1, including an end shield as a part of said frame to enclose said motor; and
   said aperture being in said end shield.

4. A spray-resistant electric motor as set forth in claim 3, wherein said water shield cooperates with the end shield.

5. A spray-resistant electric motor as set forth in claim 1, wherein said water shield is external of said frame and moves to engage the exterior surface of the frame by said urging means.

6. A spray-resistant electric motor as set forth in claim 1, wherein said load driving means includes means for mounting a fan blade on the distal end of said shaft; and
   said water shield being mounted between the fan blade mounting means and the exterior surface of said frame.

7. A spray-resistant electric motor as set forth in claim 1, wherein said urging means is spring means.

8. A spray-resistant electric motor as set forth in claim 1, wherein said water shield is an elastomeric material to establish low friction with said frame yet a tight moisture-proof seal.

9. A spray-resistant electric motor as set forth in claim 1, wherein the periphery of said water shield lies in a plane normal to the axis of said shaft.

* * * * *